United States Patent
Wiggins (10) Patent No.: US 9,755,459 B2
(45) Date of Patent: Sep. 5, 2017

(54) OUTLET CONTROL SYSTEM

(71) Applicant: LAW Enterprises, LLC, Powell, OH (US)

(72) Inventor: Erin Wiggins, Powell, OH (US)

(73) Assignee: Law Enterprises, LLC, Powell, OH (US)

( * ) Notice: Subject to any disclaimer, the term of this patent is extended or adjusted under 35 U.S.C. 154(b) by 0 days.

(21) Appl. No.: 15/060,206

(22) Filed: Mar. 3, 2016

(65) Prior Publication Data

US 2016/0261113 A1 Sep. 8, 2016

Related U.S. Application Data

(60) Provisional application No. 62/129,658, filed on Mar. 6, 2015.

(51) Int. Cl.
*H02J 13/00* (2006.01)

(52) U.S. Cl.
CPC ...... *H02J 13/0006* (2013.01); *H02J 13/0017* (2013.01)

(58) Field of Classification Search
CPC .......................... H02J 13/0006; H02J 13/0017
USPC .................................................. 307/125–126
See application file for complete search history.

(56) References Cited

U.S. PATENT DOCUMENTS

| | | | |
|---|---|---|---|
| 4,989,260 A | 1/1991 | Meade | |
| 5,457,442 A | 10/1995 | Lucero | |
| 5,895,985 A | 4/1999 | Fischer | |
| 6,380,852 B1 | 4/2002 | Hartman et al. | |
| 6,546,873 B1 | 4/2003 | Andrejkovics et al. | |
| 2009/0141522 A1* | 6/2009 | Adest | H02J 1/102 363/55 |
| 2010/0148983 A1* | 6/2010 | Huxley | H01R 13/7038 340/815.4 |
| 2010/0164299 A1 | 7/2010 | Lee et al. | |
| 2010/0327766 A1* | 12/2010 | Recker | H02J 9/02 315/291 |

(Continued)

FOREIGN PATENT DOCUMENTS

WO 2004077188 A1 9/2004

OTHER PUBLICATIONS

International Search Report and Written Opinion, International Application No. PCT/US16/20708; International Filing Date May 3, 2016; date of mailing May 17, 2016.

*Primary Examiner* — Adi Amrany
(74) *Attorney, Agent, or Firm* — Vorys, Sater, Seymour and Pease LLP; Rex W. Miller, II (57) ABSTRACT

An outlet control system includes a transmitter-detector module having a plug and at least one outlet electrically connected to the plug, wherein the transmitter-detector module is configured to transmit a control signal in response to power being applied to the transmitter plug; and a receiver-switch module comprising a receiver plug and a receiver outlet electrically connected to the plug through a power switch, wherein the receiver-switch module is configured to receive the control signal from the transmitter-detector module and provide a signal to the power switch, such that said power switch is turned on to cause the receiver plug to be connected to the receiver outlet when power is being applied to the transmitter plug and is not turned on when the power is not being supplied to the transmitter plug.

11 Claims, 10 Drawing Sheets

(56) References Cited

U.S. PATENT DOCUMENTS

| | | | | |
|---|---|---|---|---|
| 2011/0163600 A1* | 7/2011 | Garb | .................. | H01R 13/6675 |
| | | | | 307/35 |
| 2012/0086272 A1* | 4/2012 | Chen | ...................... | H02H 3/027 |
| | | | | 307/38 |
| 2012/0112666 A1* | 5/2012 | Bennette | ............ | H05B 37/0218 |
| | | | | 315/307 |
| 2012/0293153 A1* | 11/2012 | Garb | ........................ | H02J 3/00 |
| | | | | 323/311 |
| 2013/0282067 A1* | 10/2013 | Van Hulle | .............. | A61N 1/378 |
| | | | | 607/2 |
| 2014/0244040 A1* | 8/2014 | Alberth, Jr. | ......... | H04L 12/2803 |
| | | | | 700/275 |
| 2015/0054341 A1 | 2/2015 | Holder et al. | | |
| 2016/0041573 A1* | 2/2016 | Chen | ...................... | G06F 1/266 |
| | | | | 700/295 |
| 2016/0065004 A1* | 3/2016 | Fritsch | .................. | G05B 15/02 |
| | | | | 307/117 |

\* cited by examiner

OUTLET CONTROL SYSTEM

CROSS-REFERENCE TO RELATED APPLICATION

This application claims priority under 35 U.S.C. §119(e) from U.S. Provisional Application Ser. No. 62/129,658, filed on Mar. 6, 2015, which is incorporated herein by reference in its entirety.

BACKGROUND OF THE INVENTION

The present disclosure relates to a system for controlling an electrical outlet, and more particularly, to a system for extending switched control to a non-switched outlet.

Nearly every apartment or house has at least one outlet that is controlled by a wall switch. This outlet is referred to as the "switched outlet" Often in bedrooms, one wall switch will control the outlet nearest the bed, generally for use with a light. Oftentimes, however, the location of this "switched outlet" is inconvenient or not in the most efficient location. There currently exists no simple method for changing which outlet is controlled by the switch or controlling multiple outlets with the switch. The methods that currently exist generally require either rewiring the outlets or purchasing a smart home device and replacing the switch and outlet. A need exists for a simple method for changing which outlet is controlled by the switch without rewiring or extensive replacement.

SUMMARY OF THE INVENTION

Presently disclosed is an outlet control system. In an embodiment, the outlet control system includes a transmitter-detector module and a receiver-switch module. The transmitter-detector module is configured to detect the state of a switched outlet and transmit a control signal in response to the detected state. The receiver-switch module is configured to receive the control signal, and further configured to switch an outlet based upon the received control signal.

In some embodiments, the control signal includes discrete "turn on" and "turn off" codes. In other embodiments, the control signal includes a "turn on" code continuously transmitted while the switched outlet is powered on. In yet other embodiments, the control signal causes a power switch of the receiver-switch module to change state. In some embodiments, the transmitter-detector module includes a power loss detection circuit configured to detect loss of power and an energy storage circuit configured to store sufficient energy to operate the transmitter-detector module to transmit a "turn off" code.

In some embodiments, the transmitter-detector module includes a radio frequency transmitter, and the receiver-detector modules includes a radio frequency receiver. In some embodiments, the control signal is a 433 Mhz RF pulse code modulated signal.

In some embodiments, the receiver-switch module includes a switched outlet and a non-switched outlet.

In yet another embodiment, the outlet control system includes two circuit boxes. One circuit box (transmitter-detector module) is plugged into the "switched outlet" and the other circuit box (receiver-switch module) is plugged in to any other outlet in the room. When the wall switch is turned on, the circuit box plugged into the "switched outlet" sends a signal to the other circuit box instructing that second box to turn on as well. When the wall switch is turned off, the circuit box plugged into the "switched outlet" sends a signal to the other circuit box instructing that second box to turn off. Thus, even though the second outlet is not a "switched outlet", the present invention allows that second outlet to act like one. The transmitter-detector module may or may not include an outlet allowing devices to be plugged into the transmitter-detector module. If the transmitter-detector module includes an outlet, a device plugged into the transmitter-detector module may be operated as if it were directly connected to the "switched outlet". In an embodiment of the present invention, the non-"switched outlet" circuit box has two or more outlets, with not all of those outlets being controlled by the switch.

BRIEF DESCRIPTION OF THE FIGURES

The invention can be best understood from the following detailed description of exemplary embodiments of the invention taken in conjunction with the accompanying drawings.

DETAILED DESCRIPTION

This invention relates in general to a system for controlling an electrical outlet, and more particularly, a system for extending switched control to a non-switched outlet.

Referring generally to FIGS. 1-11, an outlet control system is disclosed. As described herein, an outlet control system provides switched control for a non-switched outlet. For purposes of illustration, the disclosed outlet control system is described in use in a room of a home or apartment, such as a bedroom. A room may include a switch, such as a wall switch, and a plurality of electrical outlets. As used herein, the term "outlet" refers to an electrical receptacle configured to receive an electrical plug. As is commonly known, two or more outlets may be combined in a single installation. Thus a single installation may include both a switched outlet and a non-switched outlet in the same physical installation. Each outlet may be 2-prong or 3-prong outlet as desired. An outlet may also be in the form of a light socket configured to receive the plug of a light bulb. Thus, the switched outlet may be a light socket controlled by a wall switch or other switch. In addition, the outlets may operate at any voltage and current, appropriate to the country or application. It will be understood, however, that the disclosed outlet control system is broadly applicable to any environment having one or more switched outlets and one or more non-switched outlets and that the outlet control system may be used to extend switched control to any of the non-switched outlets.

Figure 1:
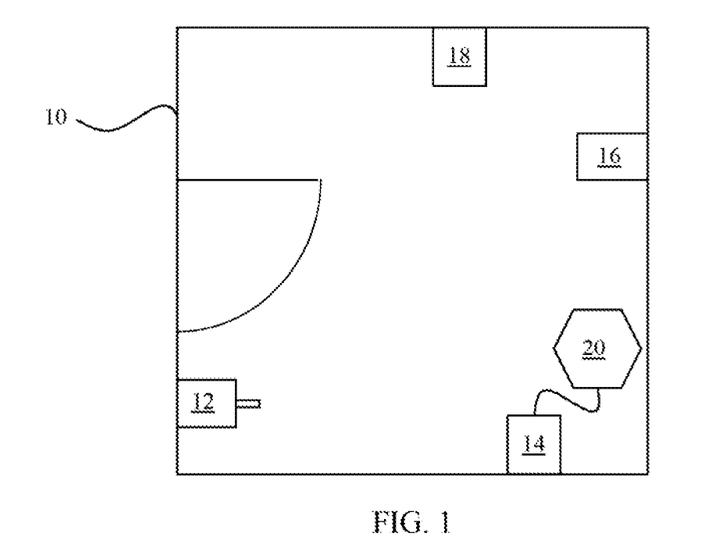
FIG. 1 is a schematic view of a room with a switch, a switched outlet, and two non-switched outlets.

Referring to FIG. 1, an exemplary room 10 is illustrated. The room 10 includes a switch 12, a switched outlet 14, a first non-switched outlet 16, and a second non-switched outlet 18. As is commonly known, the switch 12 operates to switch power at the switched outlet 14 between an ON and OFF state. In contrast to the switched outlet 14, the non-switched outlets 16, 18 are always in the ON state. As used herein, the ON state refers to a powered condition, whereas the OFF state refers to an unpowered condition. An electrical device, such as a lamp 20, may be connected to the switched outlet 14. Assuming the lamp 20 is left in an ON state, when the switch 12 is switched to the "ON" position, the switched outlet 14 is switched to the ON state, and the lamp 20 lights. Conversely, when the switch 12 is switched to the "OFF" position, the switched outlet switches to the OFF state, and the lamp 20 turns off.

Figure 2:
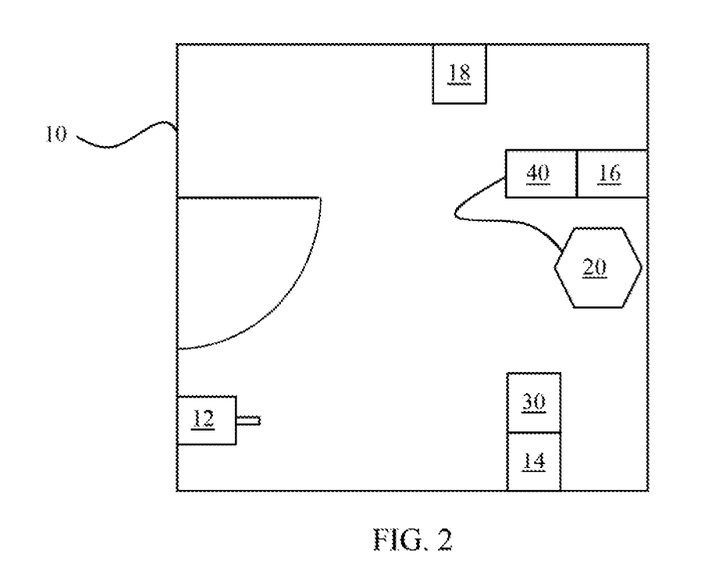
FIG. 2 is a schematic view of a room with an embodiment of an outlet control system according to the present disclosure.

Referring now to FIG. 2, the room 10 is illustrated with an outlet control system. In an embodiment, the outlet control system includes a transmitter-detector module 30 and a receiver-switch module 40. The transmitter-detector module 30 has a plug configured to be plugged into the switched outlet 14. The transmitter-detector module 30 optionally includes an outlet configured to receive an electrical plug. The receiver-switch module 40 includes a plug configured to be plugged into one of the non-switched outlets. The receiver-switch module 40 also includes an outlet configured to receive an electrical plug.

When the transmitter-detector module 30 is plugged into switched-outlet 14, an electrical device (such as the lamp 20) may be plugged into the transmitter-detector module 30. In this arrangement, operation of the switch 12 causes the lamp 20 to light (or not) in the same manner as when the transmitter-detector module 30 is not present.

In an embodiment, the transmitter-detector module 30 is configured to detect the state of the switched outlet (i.e. ON or OFF), and to transmit a control signal to the receiver-switch module 40. The receiver-switch module 40 is configured to receive the control signal and to switch the outlet of the receiver-detector module 40 between the ON and OFF states in response to the received control signal.

As shown in FIG. 2, the transmitter-detector module 30 is plugged into the switched outlet 14. The receiver-switch module 40 is plugged into the non-switched outlet 16. The lamp 20 is plugged into the outlet of the receiver-switch module 40. When the switch 12 is switched to the "ON" position, the switched outlet 14 is switched to its ON state. In response to the ON state of the switched outlet 14, the transmitter-detector module 30 transmits a control signal which is received by the receiver-switch module 40. In response to receiving the control signal, the receiver-switch module 40 closes its power switch such that the outlet of the receiver-switch module enters an ON state and the lamp lights. In a similar manner, when the switch 12 is switched to the "OFF" position, the switched outlet 14 is switched to its OFF state. The transmitter-detector module 30 transmits a control signal to the receiver-detector module 40, and the receiver-detector module opens its power switch such that the outlet of the receiver-switch module enters an OFF state and the lamp turns off. Alternatively, the transmitter-detector module 30 stops transmitting the control signal, and the receiver-detector module 40 opens its power switch in response to the loss of the control signal being received. In either manner, the switched control of the switched outlet 14 has been extended to the non-switched outlet 16.

Figure 3:
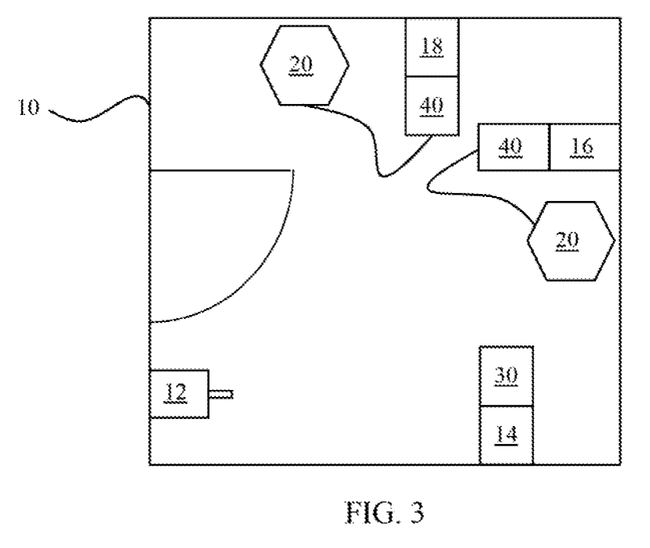
FIG. 3 is a schematic view of a room with another embodiment of an outlet control system according to the present disclosure.

Referring now to FIG. 3, the room 10 is illustrated with another embodiment of an outlet control system. As shown in FIG. 3, a transmitter-detector module 30 is plugged into switched outlet 14. A first receiver-switch module 40 is plugged into non-switched outlet 16, and a second receiver-switch module 40 is plugged into the non-switched outlet 18. Both the first and second receiver-switch modules 40 are paired with the transmitter-detector module 40, such that when the switch 12 is switched to the "ON" position, both of the lamps 20 plugged into the receiver-switch modules 40 light. Multiple receiver-switch modules may be paired with a given transmitter-detector module allowing switched control to be extended to as many non-switched outlets as desired.

Figure 4:
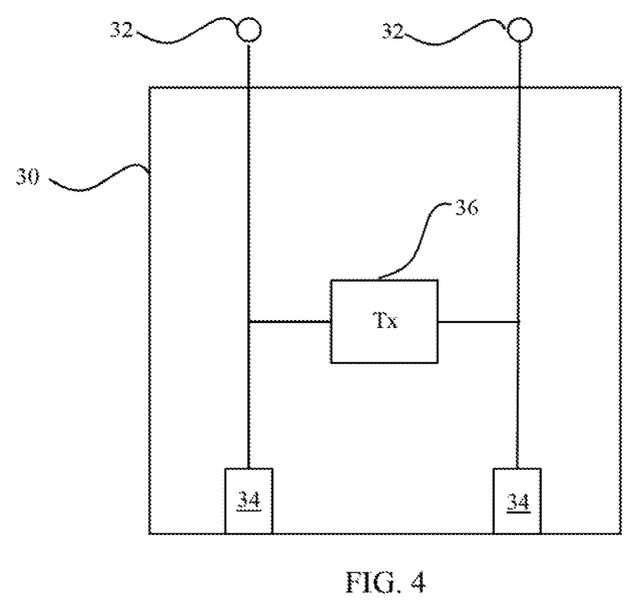
FIG. 4 is a schematic view of an embodiment of a transmitter module for an outlet control system.
Figure 5:
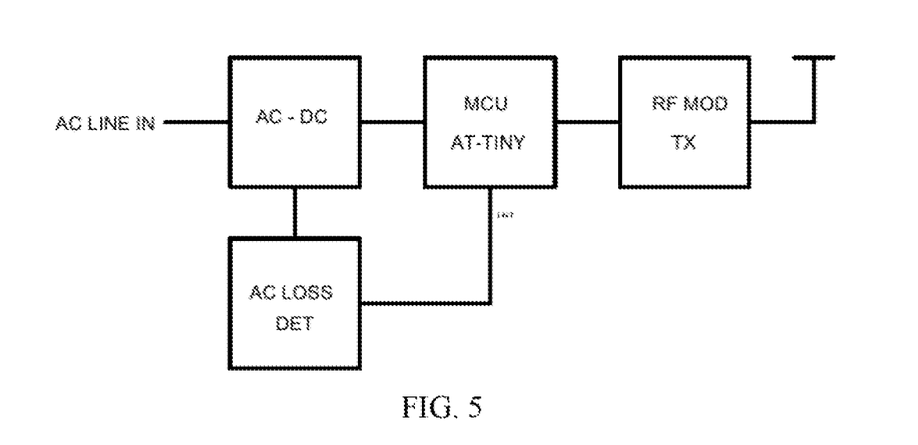
FIG. 5 is a block diagram of an embodiment of a transmitter module for an outlet control system.
Figure 6:
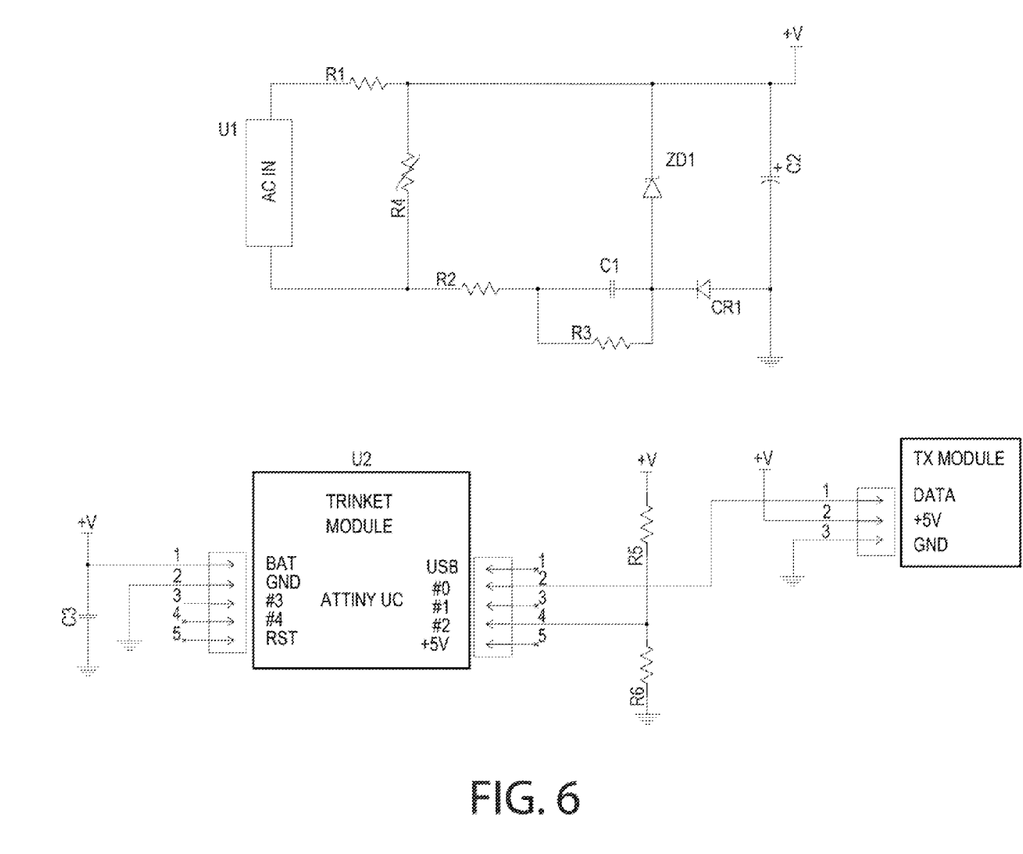
FIG. 6 is a detailed schematic view of an embodiment of a transmitter module for an outlet control system.
Figure 7:
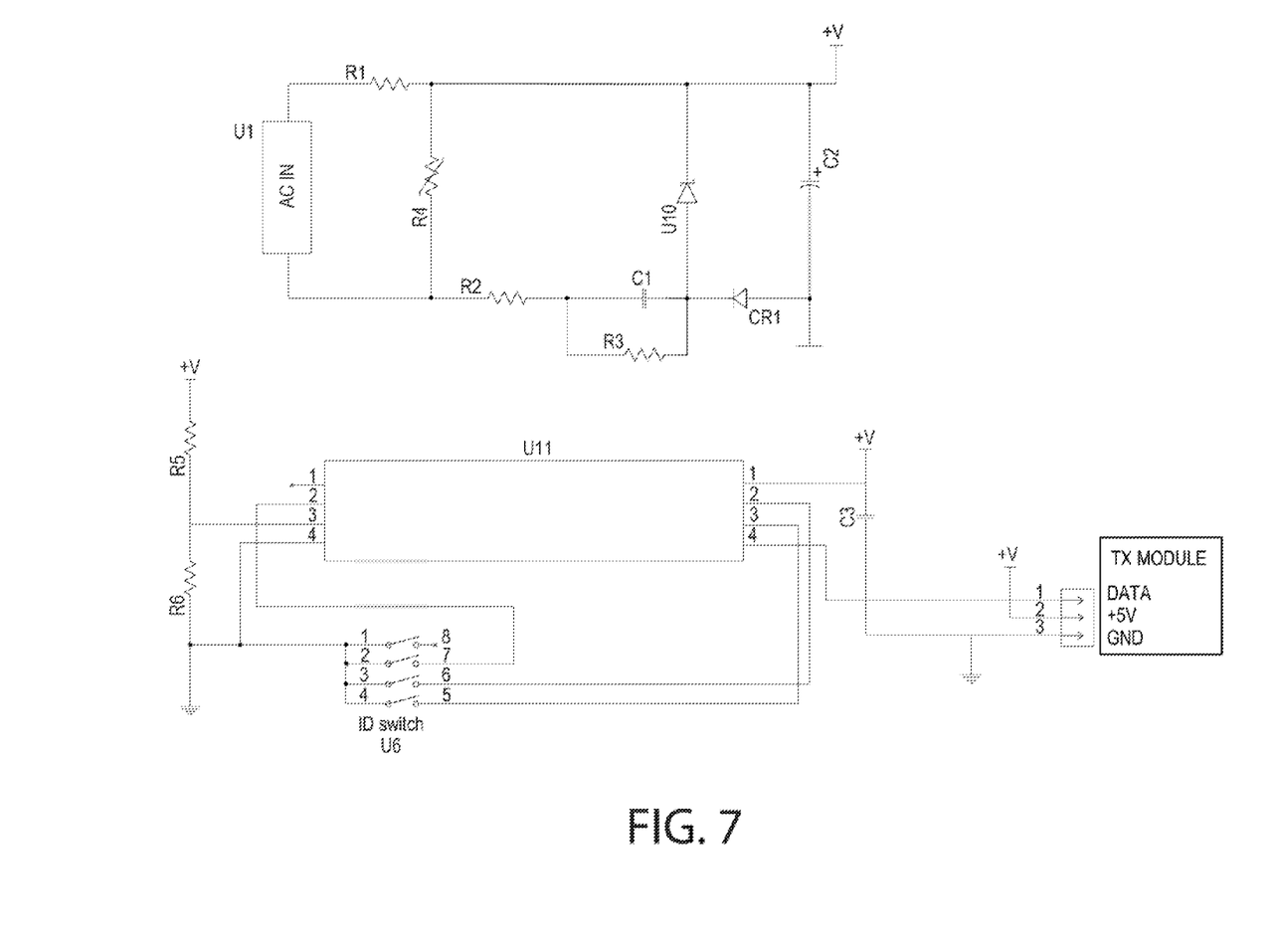
FIG. 7 is another embodiment of a transmitter module for an outlet control system.

Referring now to FIGS. 4-7, embodiments of a transmitter-detector module are illustrated. As shown in FIG. 4, a transmitter-detector module 30 includes a plug 32. The transmitter-detector module may optionally include an outlet 34. In embodiments that include an outlet, the plug 32 is electrically connected to the outlet 34 such that a device connected to outlet 34 functions in the same manner as if the device were connected to the switched outlet to which the transmitter-detector module is attached. The transmitter-detector module 30 also includes a transmitter 36. In an embodiment, the transmitter 36 receives power when the switched outlet enters an ON state. As illustrated in FIG. 5, in one embodiment, the transmitter receives power from the AC LINE IN. The transmitter may include power conversion circuitry (AC-DC), control circuitry (MCU), and a wireless transmitter (RF MOD TX). In an embodiment, the transmitter may also include AC power loss detection circuitry (AC LOSS DET). The AC power loss detection circuitry is configured to detect the loss of AC power, such as occurs when the switch 12 is switched to an "OFF" position and the switched outlet enters an OFF state. In some embodiments, the transmitter-detector may include an energy storage device, such as a capacitor, capable of storing sufficient energy to power the transmitter to communicate with the receiver-switch module to switch the receiver-switch module to an OFF state. A more detailed schematic view of one embodiment of a transmitter-detector module is illustrated in FIG. 6. A detailed schematic view of another embodiment of a transmitter-detector module is illustrated in FIG. 7.

In another embodiment (not shown), the transmitter-detector module may include two or more outlets such that the transmitter-detector module also functions as an outlet expander in addition to its function in the outlet control system.

Figure 8:
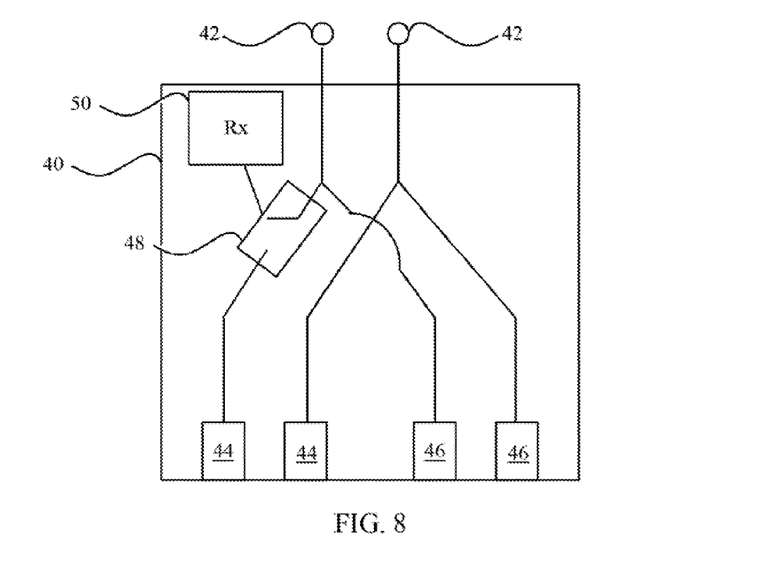
FIG. 8 is a schematic view of an embodiment of a receiver module for an outlet control system.

Referring now to FIGS. 8-11, embodiments of a receiver-switch module are illustrated. As shown in FIG. 8, a receiver-switch module 40 includes a plug 42. The receiver-switch 40 also includes a switched outlet 44. Optionally, the receiver-switch module 40 may also include a non-switched outlet 46. The non-switched outlet 46 is electrically connected to the plug 42, in parallel with the switched outlet 44. The non-switched outlet 46 bypasses the switch capability of the receiver-switch module and, therefore, functions in the same manner as the non-switched outlets 16, 18 (shown in FIGS. 1-3).

The receiver-switch module 40 also includes a power switch 48 and a receiver 50 that provides a signal to the power switch such that the power switch is turned on to cause the plug 42 to be connected to the switched outlet 44 or turned off to disconnect the plug 42 from the switched outlet 44. In this manner, when the plug 42 is connected to a non-switched outlet (such as non-switched outlets 16, 18), the power switch 48 provides control over the state of the switched outlet 44 in response to the control signal received by receiver 50.

Figure 9:
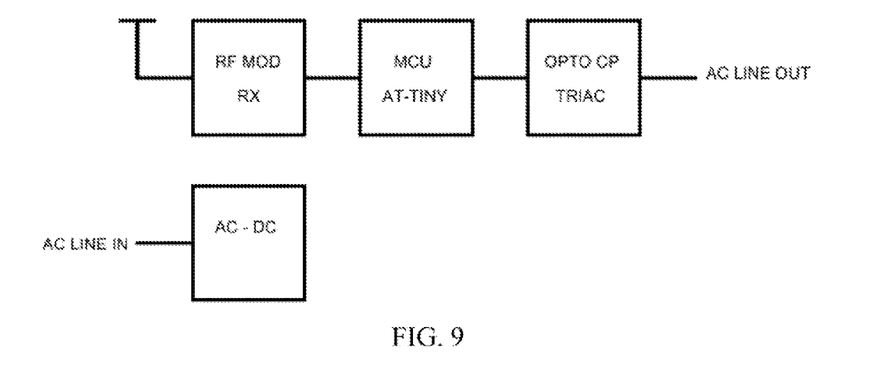
FIG. 9 is a block diagram of an embodiment of a receiver module for an outlet control system.
Figure 10:
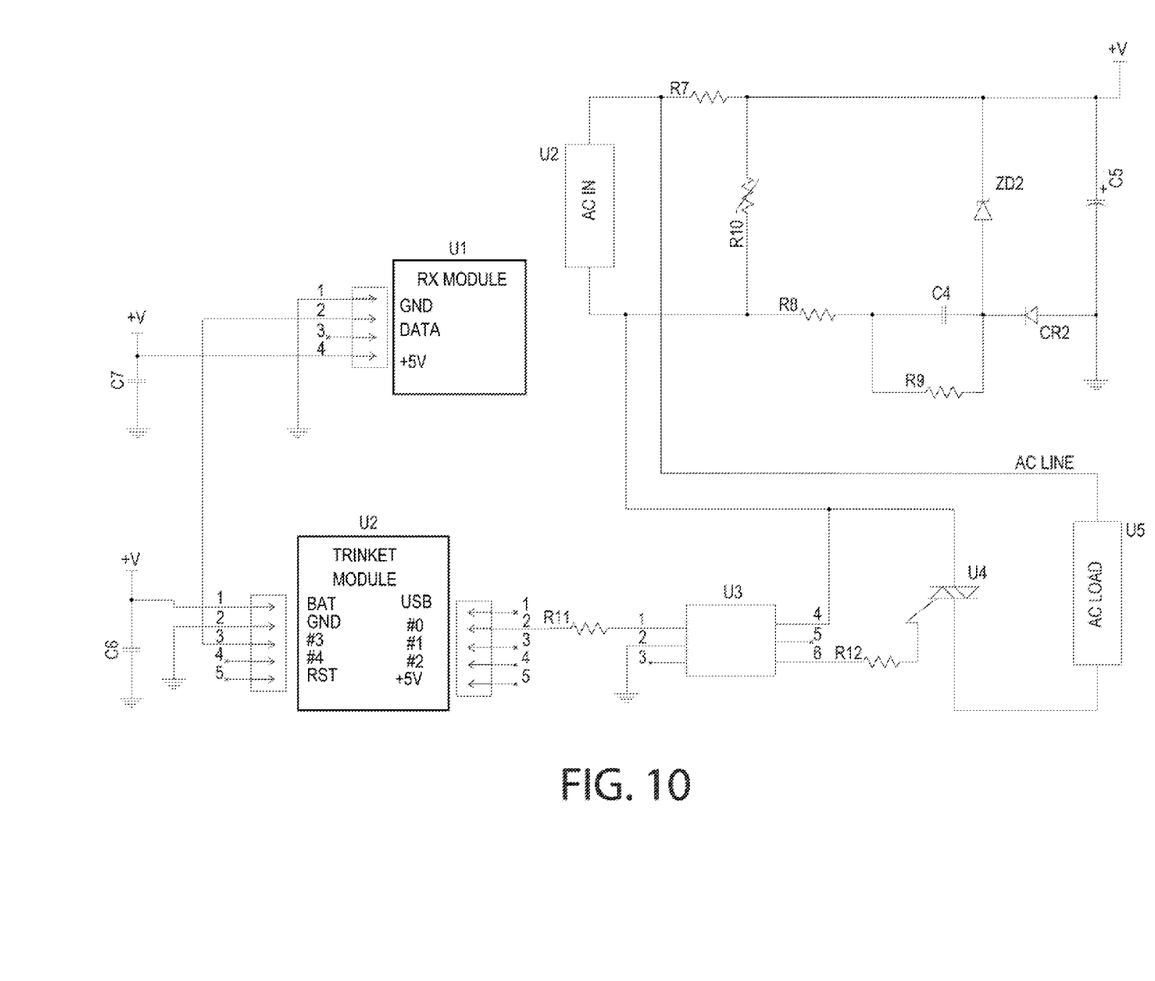
FIG. 10 is a detailed schematic view of an embodiment of a receiver module for an outlet control system.
Figure 11:
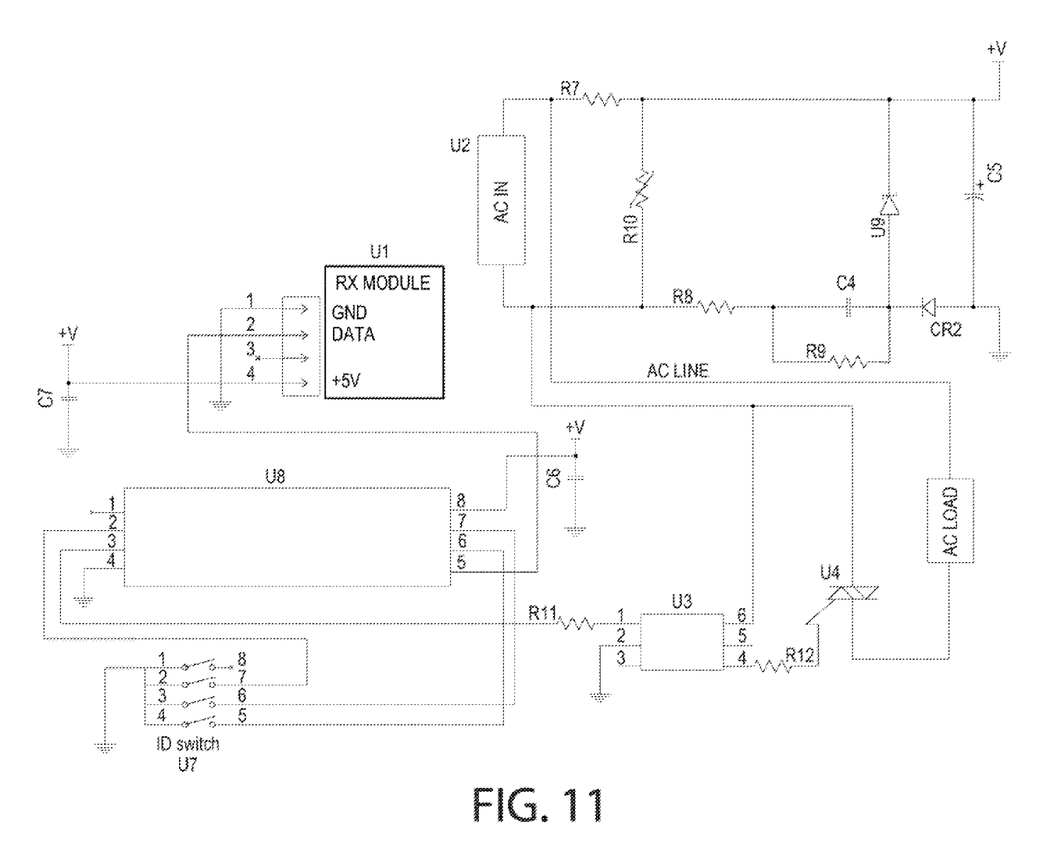
FIG. 11 is another embodiment of a receiver module for an outlet control system.

Referring to FIG. 9, a block diagram of one embodiment of a receiver-switch module is illustrated. The receiver-switch module receives power from the AC LINE IN. The receiver-switch module includes a wireless receiver (RF MOD RX) for receiving the control signal from the transmitter-detector module, and control circuitry (MCU) to control a switch (OPTO CP TRIAC) to establish the outlet (AC LINE OUT) in an ON or OFF state. A more detailed schematic view of the circuitry of a receiver-switch module is illustrated in FIG. 10. A detailed schematic view of another embodiment of a receiver-switch module is illustrated in FIG. 11.

In an embodiment, the power switch 48 of the receiver-switch module 40 is a fail-safe switch that is configured to maintain an open circuit if the switch or related circuitry fails. In this manner, a failure of the receiver-switch module will result in the module maintaining an OFF state for the switched outlet 44.

In an embodiment, a transmitter-detector module is paired with a single receiver-switch module. In other embodiments, a transmitter-detector module is paired with a plurality of receiver-switch modules. In some embodiments, the pairing of transmitter-detector modules with receiver-switch modules is programmable. In one embodiment, each transmitter-detector is assigned a unique pre-set code, and each receiver-switch module may be programmed or reprogrammed to respond to the unique pre-set code of the transmitter-detector module. In an embodiment, the code is a pseudorandom code preassigned to the transmitter detector module, and the receiver-switch module is configured to receive and store the pseudorandom code from the transmitter-detector module during a pairing operation, such that the receiver-switch module is associated with the transmitter-detector module. In another embodiment, a transmitter-detector module may be programmable, and the receiver-switch modules also programmable to respond to the transmitter-detector module. In various embodiments, one or both of the transmitter-detector module and receiver-switch module include a code selector (see, e.g. FIGS. 7, 11 "CODE #"). In one embodiment, the code selector includes multiple binary switches that, in combination, function to set a code. For example, a code selector with three binary switches may be used to set a code to a value from 000 to 111 binary (0 to 7 decimal). When a given transmitter-detector module and receiver-switch module are set to the same code, the modules will be paired. In some embodiments, the code selector may be set mechanically, while in other embodiments the code selector may be set electronically. In either case, the pairing of the transmitter-detector module and receiver-switch modules allows for multiple outlet control systems to operate in close proximity (i.e. within the range of the transmitter in the transmission-detector modules). The pairing of modules also allows a single transmitter-detector module to control multiple receiver-switch modules. In other applications, a single receiver-switch module may be controlled by multiple transmitter-detector modules. The disclosed outlet control system thereby allows for rapid and flexible reconfigurations of the switched outlet control throughout a home or apartment.

As described above, the transmitter-detector module communicates with the receiver-switch module wirelessly. In one embodiment, the communication is performed with radio frequency transmitters and receivers, and the transmitter-detector module and the receiver-switch module each include an antenna configured to transmit or receive the control signal at the selected frequency. In an embodiment, the radio frequency transmitters and receivers operate at approximately 433 Mhz. In other embodiments, radio frequency communication may be performed at other frequencies. In an embodiment, the control signal communicated between the transmitter-detector module and the receiver-switch module is a pulse code modulated (PCM) signal. A PCM signal may be less susceptible to interference and reduce the potential for erroneous activation of the receiver-switch module. In embodiments, the radio frequency communication has a minimum range of at least 20 feet, however longer ranges, such as at least 150 feet, are also contemplated.

In yet other embodiments, other wireless communication techniques may be employed. For example, Bluetooth communication may be utilized to pair a given transmitter-detector module with a receiver-switch module. In other environments where a line of sight is available between the transmitter-detector module and the receiver-switch module, an infrared communication may be used to transmit the control signal.

Figure 12:
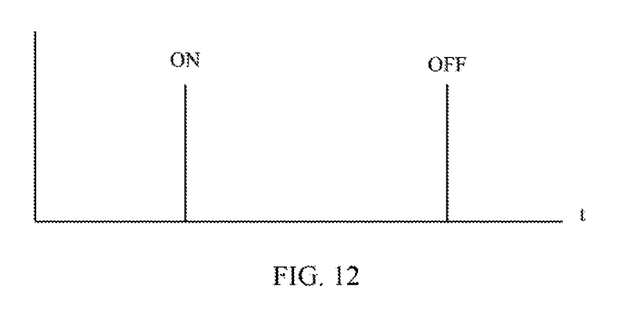
FIG. 12 is a graph of a control signal for an outlet control system.
Figure 13:
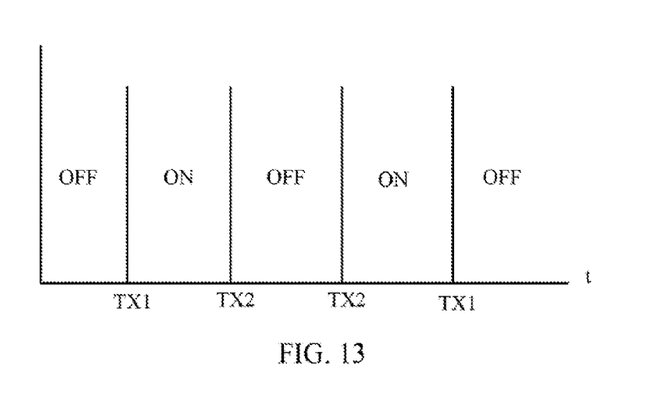
FIG. 13 is a graph of another control signal for an outlet control system.
Figure 14:
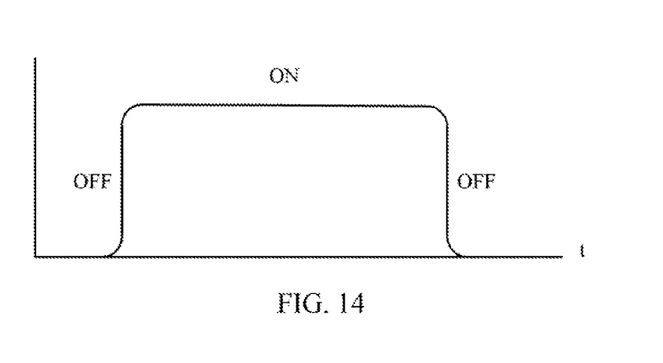
FIG. 14 is a graph of another control signal for an outlet control system.

Referring to FIGS. 12-14, the operation of the outlet control system is further illustrated with respect to the control signal communicated between the transmitter-detector module and the receiver-switch module. In an embodiment, the control signal includes discrete ON and OFF commands communicated to the receiver-switch module. The transmitter-detector module is plugged into a standard 3-prong, 120 VAC switched outlet. When the switched outlet is powered on (i.e. switched to an ON state), the transmitter-detector module receives power and wakes up. The transmitter-detector sends a "turn on" code to the receiver-detector module. The "turn on" code may be communicated using the radio frequency transmitter and may be communicated via 433 Mhz RF PCM. The transmission of the "turn on" command control signal is illustrated in FIG. 12, labeled ON. While the switched outlet is in the ON state, the transmitter-detector module stores energy in an energy storage component, such as a capacitor. When the switched outlet is switched to the OFF state, the transmitter-detector module has enough stored energy to send a "turn off" code before the transmitter-detector module shuts down. The transmission of the "turn off" command control signal is illustrated in FIG. 12, labeled OFF. In this manner, communication of the control signal is limited to the "turn on" and "turn off" codes. In addition, the transmitter-detector module is configured to detect the loss of power associated with a transition to the OFF state so that the "turn off" command may be transmitted before power is lost.

In another embodiment, illustrated in FIG. 13, the control signal does not include discrete ON and OFF commands, but signals the receiver-detector module to "change state". In an embodiment in which the receiver-switch module is paired with multiple transmitter-detector modules, when the receiver-switch module receives the control signal from any of the transmitter-detector modules, the receiver-switch module provides a signal to the power switch to cause the power switch to change state, such that the power switch is alternately turned on to cause the receiver plug to be connected to the receiver outlet, and turned off to cause the receiver plug to be disconnected from the receiver plug. An example of this embodiment and the resulting state of the switched outlet of the receiver-switch module is illustrated in FIG. 13 in response to control signals received from two transmitter-detector modules (TX1, TX2).

In another embodiment, illustrated in FIG. 14, the transmitter-detector module is plugged into an outlet as described above. When the switched outlet is powered on (i.e. switched to the ON state), the transmitter-detector module receives power and wakes up. In this embodiment, the transmitter-detector sends a control signal to the receiver-switch module continuously so long as the switched outlet is powered on. The receiver-switch module receives the control signal continuously and so long as the control signal is being received, the receiver-switch module turns on the power switch thereby applying power to the switched outlet of the receiver-switch module. When the switched outlet is powered off, the transmitter-detector loses power and stops transmitting the control signal. The transmitter-detector may stop transmitting upon power loss, or may detect power loss and stop transmitting as part of a controlled shut down sequence using power stored in an energy storage circuit. In either event, when the control signal is no longer received by the receiver-switch module, the receiver-switch module turns off its power switch thereby de-powering its switched outlet.

In yet another embodiment, a system includes a transmitter-detector module and a receiver-switch module. The transmitter-detector module has a plug and, optionally, at least one outlet electrically connected to the plug and is configured to transmit a control signal in response to power being applied to the transmitter plug. The receiver-switch module has a receiver plug and a receiver outlet electrically connected to the receiver plug through a power switch, and is configured to receive the control signal from the transmitter-detector module and provide a signal to the power switch, such that said power switch is turned on to cause the receiver plug to be connected to the receiver outlet when power is being applied to the transmitter plug and is not turned on when the power is not being supplied to the transmitter plug.

In some embodiments, the receiver-switch module includes at least one non-switched outlet that is electrically connected to the receiver plug not through the power switch.

In some embodiments, the transmitter-detector module includes a transmitter for transmitting the control signal, and the transmitter is activated in response to power being applied to the transmitter plug.

Figure 15:
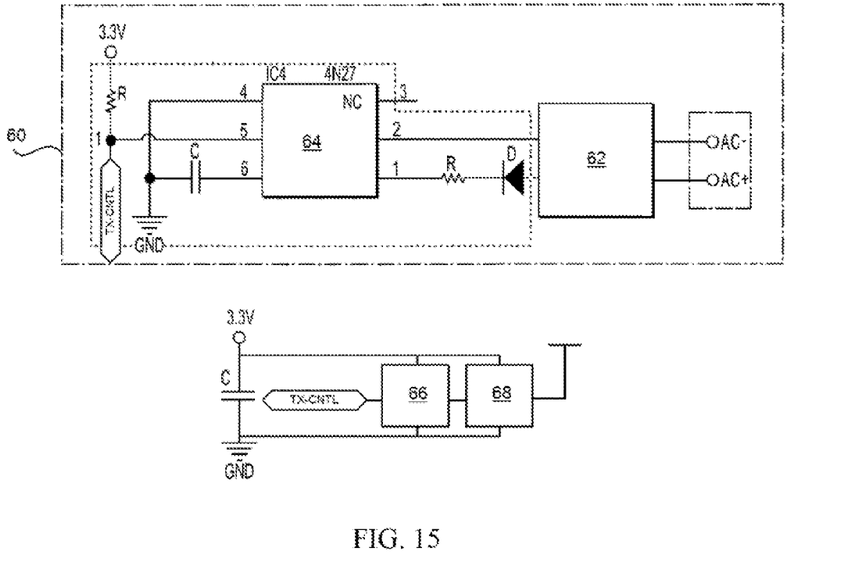
FIG. 15 is a schematic view of another embodiment of a transmitter-detector module for an outlet control system.

Referring now to FIG. 15, in some embodiments, the transmitter-detector module includes a power detection sensor 60 connected in circuit with contacts of the transmitter plug (AC+, AC−) and configured to detect the presence of power being applied to the transmitter plug. In an embodiment, the power detection sensor 60 also includes a rectifier 62 and an optically coupled isolator phototransistor 64 configured to generate an output signal (TX CNTL) in response to power being applied to the transmitter plug. In an embodiment, the transmitter-detector module also includes a microcontroller 66 configured to receive the output signal (TX CNTL) from the sensor 60 and provide a signal to a transmitter circuit 68.

In one embodiment, microcontroller 66 is configured to cause the transmitter circuit 68 to transmit the control signal to the receiver-switch module in response to the signal from the power detection sensor 60 indicating that power is being applied to the transmitter plug and not transmit the control signal when the signal from the power detection sensor indicates that power is not being applied to the transmitter plug.

In another embodiment, the microcontroller 66 is configured to cause the transmitter circuit 68 to transmit the control signal to the receiver-switch module in response to the signal from the power detection sensor 60 indicating that power is being applied to the transmitter plug and then to stop transmitting the control signal, and to transmit a second control signal to the receiver-switch module in response to the signal from the power detection module indicating that power is not being applied to the transmitter plug.

In yet another embodiment, the transmitter-detection module is further configured to detect the loss of power being applied to the transmitter plug. For example, the loss of power may be detected by monitoring the transition of the TX CNTL signal from a low to high state. The transmitter-detection module may include an energy storage circuit, such as capacitor 70, configured to store sufficient energy to operate the transmitter-detector module to transmit the second control signal after the loss of power to the transmitter plug. The energy storage circuit, such as capacitor 70, is charged when power is applied to the transmitter plug.

In another embodiment, a transmitter-detector module is in the form of a light socket in which the transmitter plug is a threaded plug, and the transmitter outlet is a threaded socket. The transmitter detector module functions in the same manner as the embodiments previously discussed, but is configured to be attached between a light socket and a conventional light bulb with a threaded base. If a wall switch (or other switch) controls a light fixture, the transmitter-detector module operates to extend the switched control to non-switched outlets using the receiver-switch module as previously discussed. In other embodiments, the receiver-switch module may also be provided in the form of a light socket to add the controllable switch function to lights that are either always on or left in a powered state.

Figure 16:
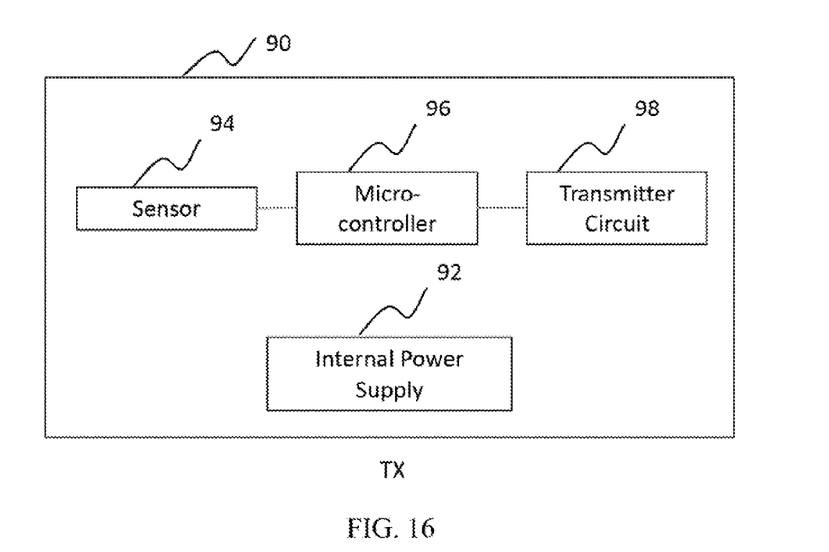
FIG. 16 is a block diagram of a transmitter-detector module for an outlet control system.

Referring now to FIG. 16, another embodiment of a transmitter-detector module is illustrated. The transmitter-detector module 90 includes a transmitter circuit 98, a sensor 94, a microcontroller 96, and an internal power supply 92. The microcontroller 96 is configured to receive an input signal from the sensor 92 and provide an output signal to the transmitter circuit 98 to cause the transmitter circuit to transmit a control signal. The receiver-switch module is configured to receive the control signal from the transmitter-detector module and provide a signal to the power switch to cause the power switch to change state in response to receiving the control signal, such that said power switch is alternately turned on to cause the receiver plug to be connected to the receiver outlet and turned off to cause the receiver plug to be disconnected from the receiver outlet.

The internal power supply 92 provides power to the sensor 92, the microcontroller 96, and the transmitter circuit 98. In this manner, the transmitter-detector module 90 may be used in configurations that are not attached to a powered outlet. For example, the transmitter-detector module may be in the form of a portable switch that may be carried or temporarily affixed to a surface, such as a wall. In one embodiment, the transmitter-detector module includes a toggle switch connected to the sensor and configured to activate the sensor such that the power switch of the receiver-switch module changes state. In another embodiment, the transmitter-detector module includes a push button control connected to the sensor and configured to activate the sensor such that the power switch of the receiver-switch module changes state.

In yet other embodiments, the sensor 92 of the transmitter-detector module may include a motion sensor, such that the power switch of the receiver-switch module is turned on in response to motion detected by the motion sensor. The transmitter-detector module may also include a timer, such that upon expiration of the timer the transmitter-detector module transmits a control signal causing the receiver-switch module to turn off. In this manner, the presently disclosed system provides the ability to control an outlet based on motion detected at a remote location.

In yet another embodiment, the sensor 92 of the transmitter-detector may be a light sensor, such that the power switch of the receiver-switch module is turned on or turned off in response to the level of detected light. In this manner, the presently disclosed system provides the ability to control an outlet based on light detected at a remote location.

In yet another embodiment, the transmitter-detector module may be integrated into a smart control system. The smart system may include one or more processors or communication devices capable of activating the transmission circuit of the transmitter-detector module. In this manner, a smart system augmented with the disclosed transmitter-detector module may function with one or receiver-switch modules without requiring smart receivers to be installed at each outlet to be controlled.

In yet another embodiment, the transmitter-detector module may include a display and a programmable timer allowing a user to configure the transmitter to turn on or turn off the receiver-switch modules based on preprogrammed times or durations.

In the various embodiments described above, the disclosed system extends switched outlet control to non-switched outlets without the difficulty of rewiring or cost of complex smart home systems.

While principles and modes of operation have been explained and illustrated with regard to particular embodiments, it must be understood, however, that this may be practiced otherwise than as specifically explained and illustrated without departing from its spirit or scope.

What is claimed is:

1. A system comprising:
a transmitter-detector module comprising a threaded plug configured to mate with a light socket of a light fixture controlled by a wall switch, a threaded socket configured to receive a light bulb, a power detection sensor connected with contacts of the transmitter plug and configured to detect the presence of power being applied to the transmitter plug and a microcontroller configured to receive an input signal from the power detection sensor and to provide an output signal to a transmitter circuit, wherein the transmitter-detector module is configured to wirelessly transmit a control signal in response to power being applied to the transmitter plug; and
a receiver-switch module comprising a receiver plug configured to mate with an unswitched electrical outlet and a receiver outlet electrically connected to the plug through a power switch, wherein the receiver-switch module is configured to wirelessly receive the control signal from the transmitter-detector module and provide a signal to the power switch, such that said power switch is turned on to cause the receiver plug to be connected to the receiver outlet when power is being applied to the transmitter plug and is not turned on when the power is not being supplied to the transmitter plug.

2. The system of claim 1, wherein the receiver-switch module includes at least one non-switched outlet that is electrically connected to the receiver plug not through the power switch.

3. The system of claim 1, wherein the transmitter circuit includes a transmitter for transmitting the control signal, wherein the transmitter is activated in response to power being applied to the transmitter plug.

4. The system of claim 1, wherein the control signal is a pseudorandom code preassigned to the transmitter-detector module.

5. The system of claim 4, wherein the receiver-switch module is configured to receive and store the pseudorandom code from the transmitter-detector module during a pairing operation, such that the receiver-switch module is associated with the transmitter-detector module.

6. The system of claim 4 wherein receiver-switch module has a code selector configured for associating the receiver-switch module to the pseudorandom code assigned to the control signal of the transmitter-detector module.

7. The system of claim 1, wherein receiver-switch module has a code selector configured for associating the receiver-switch module to a code assigned to the control signal of the transmitter-detector module.

8. The system of claim 1, wherein the transmitter circuit transmits the control signal to the receiver in response to the signal from the power detection sensor indicating that power is being applied to the transmitter plug and does not transmit the control signal when the signal from the power detection sensor indicates that power is not being applied to the transmitter plug.

9. The system of claim 1, wherein the transmitter circuit transmits the control signal to the receiver-switch module in response to the signal from the power detection sensor indicating that power is being applied to the transmitter plug and transmits a second control signal to the receiver-switch module in response to the signal from the power detection module indicating that power is not being applied to the transmitter plug.

10. The system of claim 9, wherein the transmitter-detection module is further configured to detect the loss of power being applied to the transmitter plug, and further comprises an energy storage circuit configured to store sufficient energy to operate the transmitter-detector module to transmit the second control signal after the loss of power to the transmitter plug.

11. The system of claim 9, wherein the energy storage circuit comprises a rechargeable energy storage device that is charged when power is applied to the transmitter plug.

* * * * *